UNITED STATES PATENT OFFICE.

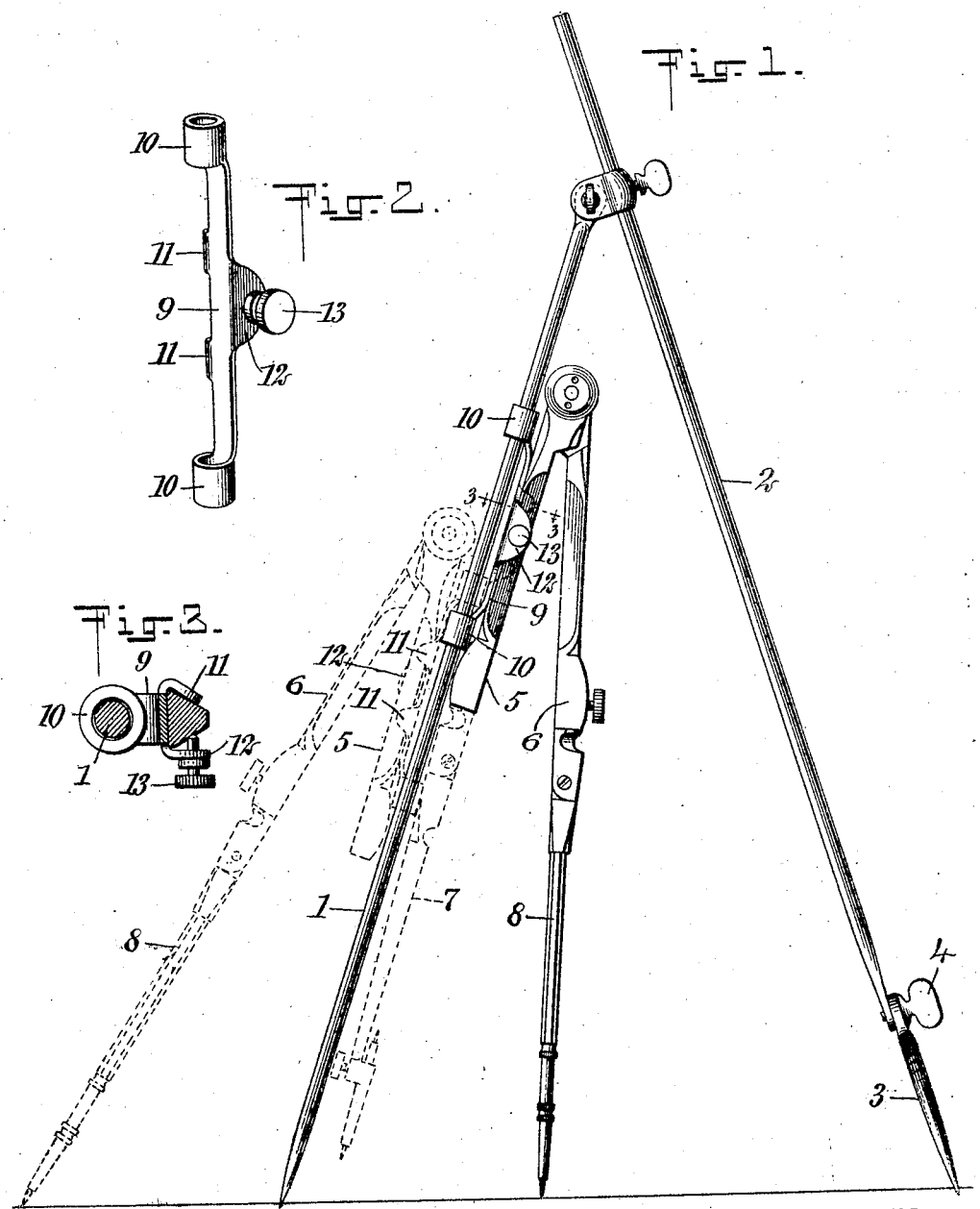

JAMES T. KELLEY, OF WEST RUSH, NEW YORK.

ELLIPSOGRAPH.

No. 889,313.　　Specification of Letters Patent.　　Patented June 2, 1908.

Application filed August 17, 1907. Serial No. 389,015.

*To all whom it may concern:*

Be it known that I, JAMES T. KELLEY, a citizen of the United States, and a resident of West Rush, in the county of Monroe and State of New York, have invented a new and Improved Ellipsograph, of which the following is a full, clear, and exact description.

This invention relates to certain improvements in ellipsographs, and more particularly to certain improvements in connection with the ellipsograph disclosed and claimed in my previous patent Number 861,861, dated July 30, 1907.

A special object of the present invention is to provide means whereby a compass of the ordinary form of construction may be readily attached to and detached from the inclined rod and held in sliding engagement therewith.

A further object is to so construct the attaching means that the compass leg and rod are held more securely in parallelism.

Reference is to be had to the accompanying drawings, forming a part of this specification, in which similar characters of reference indicate corresponding parts in all the figures, and in which Figure 1 is a side elevation of an ellipsograph constructed in accordance with my invention; Fig. 2 is a perspective view of the attachment *per se;* and Fig. 3 is a transverse section on the line 3—3 of Fig. 1.

The specific form of the ellipsograph illustrated in the accompanying drawings involves the employment of a tripod similar in construction to that disclosed in my previous patent above referred to, but it is evident that other forms of tripods may be employed if desired.

As shown, the tripod involves a rod 1 having jointed and sliding connections at its upper end with a second rod 2, the lower end of which is provided with a base involving two prongs 3 held together by a set screw 4. The lower ends of the two prongs 3 and the lower end of the rod 1 constitute three points of support and facilitate the firm supporting and steadying of the rod 1.

In connection with the tripod I employ a compass provided with two legs 5 and 6 having pivotal connections at one end. At the opposite end of the legs from said pivotal connections there are provided detachable sections 7 and 8, as is common in the art. In fact, I preferably do not manufacture a special compass for use in the ellipsograph, but so construct the other parts that any compass at hand may be employed.

For slidably connecting the compass to the rod 1, I provide an attachment illustrated most clearly in Fig. 2. The attachment involves a longitudinal body portion 9 having separate collars 10 disposed in alinement with each other and at opposite ends of said body. Intermediate the two collars and extending on the opposite side from said body portion, I provide two lugs 11 upon one edge and a lug 12 upon the opposite edge intermediate the two. The shape and arrangement of these lugs which constitute the clamp are such that the lugs may readily engage with the compass leg. As illustrated, the two lugs 11 bend inwardly at an acute angle, while the lug 12 extends outwardly at substantially right angles to the body and carries a small set screw 13. The two collars are of such size that they closely fit the rod 1 and guide the attachment in its longitudinal movement. The two lugs 11 engage with one side of the compass leg, while the set screw passing through the lug 12 engages with the opposite side and securely and firmly binds the attachment rigid to the compass leg. The detachable section 7 (shown in dotted lines in Fig. 1) of the compass leg 5, is removed when the compass is secured to the attachment, whereby the compass may freely rotate about the rod 1, with the lower tip of the detachable section 8 of the leg 6 in engagement with the surface upon which the ellipse is to be marked.

The operation of the ellipsograph is substantially that set forth in my previous patent, the only difference being in the structure of the compass and the method of slidably and rotatably attaching the same to the rod 1.

Having thus described my invention, I claim as new and desire to secure by Letters Patent:

1. An ellipsograph, including a rod, a compass, and an attachment for holding one leg of the compass substantially parallel to said rod, said attachment being rigidly connected to one and slidably and rotatably connected to the other.

2. An ellipsograph, comprising a rod, a compass, and an attachment for holding one leg of the compass substantially parallel to said rod, said attachment being rigidly but detachably connected to said compass and slidably connected to said rod.

3. An ellipsograph, comprising a rod, a compass, an attachment for securing one leg of the compass to said rod, said attachment having a body portion rigidly secured to one leg of the compass, and two collars at opposite ends of said body portion and slidably mounted upon said rod.

4. An attachment for securing one member rotatably and slidably to another member, comprising a body portion formed of sheet metal and having collars at opposite ends thereof and integral therewith for slidably engaging with one of said members, and a clamp on the opposite side of said body for rigidly securing the attachment to the other of said members, said clamp being formed of a plurality of lugs integral with said body portion and bent outwardly therefrom, and a set screw carried by one of said lugs.

In testimony whereof I have signed my name to this specification in the presence of two subscribing witnesses.

JAMES T. KELLEY.

Witnesses:
S. SOUTHWORTH,
JNO. W. MELLEN.